US012597720B2

(12) United States Patent
Sauvain

(10) Patent No.: US 12,597,720 B2
(45) Date of Patent: Apr. 7, 2026

(54) CONNECTOR FOR COAXIAL CABLE THAT IS STRUCTURALLY CONFIGURED TO ALLOW UNIDIRECTIONAL ROTATION OF CABLE GRIPPING PORTION

(71) Applicant: PPC BROADBAND, INC., East Syracuse, NY (US)

(72) Inventor: Henry Sauvain, East Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 347 days.

(21) Appl. No.: 18/386,698

(22) Filed: Nov. 3, 2023

(65) Prior Publication Data

US 2024/0154327 A1 May 9, 2024

Related U.S. Application Data

(60) Provisional application No. 63/435,922, filed on Dec. 29, 2022, provisional application No. 63/422,883, filed on Nov. 4, 2022.

(51) Int. Cl.
*H01R 9/00* (2006.01)
*H01R 9/05* (2006.01)
*H01R 24/40* (2011.01)
*H01R 103/00* (2006.01)

(52) U.S. Cl.
CPC ............... *H01R 9/05* (2013.01); *H01R 24/40* (2013.01); *H01R 2103/00* (2013.01)

(58) Field of Classification Search
CPC ....... H01R 24/30; H01R 9/05; H01R 2103/00
See application file for complete search history.

(56) References Cited

U.S. PATENT DOCUMENTS 6,005,518 A * 12/1999 Kallina .............. G01R 29/0814 379/22
6,042,422 A * 3/2000 Youtsey ............... H01R 9/0518 439/585
6,123,567 A * 9/2000 McCarthy ............. H01R 9/053 439/427

(Continued)

FOREIGN PATENT DOCUMENTS

KR 20040105632 A 12/2004
KR 100646757 11/2006

OTHER PUBLICATIONS

International Search Report and Written Opinion dated Apr. 19, 2024 in corresponding International Application No. PCT/US2023/036743, 12 pages.

*Primary Examiner* — Phuong Chi Thi Nguyen
(74) *Attorney, Agent, or Firm* — MH2 TECHNOLOGY LAW GROUP LLP; Stuart I. Smith

(57) ABSTRACT

A connector includes: a first portion; a second portion; and a cable gripping portion. The cable gripping portion is structurally configured to allow rotation of the cable gripping portion relative to the second portion in a second rotational direction to permit tightening of the second portion to a third portion; and the cable gripping portion is structurally configured to engage the second portion to prevent the cable gripping portion from rotating relative to the second portion in a first rotational direction so as to permit a coaxial cable to be rotated relative to the cable gripping portion while inserting the coaxial cable into the connector.

29 Claims, 6 Drawing Sheets

(56) References Cited

U.S. PATENT DOCUMENTS

| | | | | |
|---|---|---|---|---|
| 7,103,460 | B1 * | 9/2006 | Breed | G07C 5/008<br>706/15 |
| 7,286,097 | B1 * | 10/2007 | Van Buren | H01Q 19/30<br>343/810 |
| 7,527,524 | B1 | 5/2009 | Coleman et al. | |
| 9,614,273 | B1 * | 4/2017 | Sena | H01Q 1/36 |
| 9,793,593 | B1 * | 10/2017 | Aster | H01P 11/002 |

* cited by examiner

CONNECTOR FOR COAXIAL CABLE THAT IS STRUCTURALLY CONFIGURED TO ALLOW UNIDIRECTIONAL ROTATION OF CABLE GRIPPING PORTION

CROSS-REFERENCE TO RELATED APPLICATION

This application claims the benefit of U.S. Provisional Application No. 63/435,922 filed Dec. 29, 2022, and U.S. Provisional Application No. 63/422,883 filed Nov. 4, 2022, the disclosures of which is hereby incorporated by reference herein in their entirety.

BACKGROUND

The present invention relates generally to connectors for terminating coaxial cable. More particularly, the present invention relates to axially compressible connectors for hardline or semi-rigid coaxial cables.

Coaxial cables are commonly used in the cable television industry to carry cable TV signals to television sets in homes, businesses, and other locations. A hardline coaxial cable may be used to carry the signals in distribution systems exterior to these locations and a flexible coaxial cable is then often used to carry the signals within the interior of these locations. Hardline or semi-rigid coaxial cable is also used where a high degree of radio-frequency (RF) shielding is required.

The hardline cable includes a solid wire core or inner conductor, typically of copper or copper-clad aluminum, surrounded by a solid tubular outer conductor. The outer conductor is also usually made of copper or aluminum. Dielectric material or insulation separates the inner and outer conductors. The outer conductor is covered with a cable jacket or sheath of plastic to provide protection against corrosion and weathering.

Threaded cable connectors have been employed to provide even compression of the connector. Such connectors typically utilize some form of clamping mechanism that radially compresses the outer conductor of the cable against a tubular post or mandrel upon axial threaded movement of the connector components to retain the cable in the hardline connector. The clamping mechanism may include a conical sleeve surrounded by an outer sleeve which forces the conical sleeve to radially compress upon axial movement of the outer sleeve with respect to the conical sleeve. The length of the conical closure sleeve typically closes the full length of the mechanism with equal forces around the circumference of the mandrel. The resulting forces closing down on the coaxial cable compress the cable around the outside of the mandrel creating a formed bond on the outside surface.

The above referenced, and other, connectors can be used with cables having different outside diameters. However, cables having different outside diameters require the clamping mechanism to apply different amounts of compression to properly install the connector on the cable.

Also, when inserting a cable into a connector, the cable can move axially out of the connector before or during the tightening of a nut to tighten the clamping mechanism onto the cable.

It may be desirable to provide a connector that overcomes one or more of the aforementioned disadvantages of hardline connectors. Also, it may be desirable to provide a connector having an improved system for securing the cable in the connector while the connector is fully installed on the cable. For example, it may be desirable to provide threads on an inner surface of a clamping ferrule that are configured to receive the cable in a twisting motion to secure the cable in an axial direction during assembly. That is, it may be desirable to provide a connector having an improved system for use on cables of different outside diameters.

SUMMARY

Embodiments of the disclosure prevent the rotation of a cable gripping ferrule relative to a center body of a connector to simplify connecting the connector to a coaxial cable by allowing a user to rotate the coaxial cable while inserting the coaxial cable into the connector such that the coaxial cable engages a helical internal gripping surface and threads the coaxial cable onto the helical internal gripping surface of the cable gripping ferrule.

Embodiment include a connector that is structurally configured to allow rotation of a cable gripping portion relative to a second portion in a second rotational direction to permit tightening of the second portion to a third portion; wherein the cable gripping portion is structurally configured to engage the second portion to prevent the cable gripping portion from rotating relative to the second portion in a first rotational direction so as to permit the cable gripping portion to be threadedly coupled with a coaxial cable by rotating the coaxial cable relative to the cable gripping portion while inserting the coaxial cable into the connector; and wherein the cable gripping portion includes a gap that is structurally configured to permit the cable gripping portion to move radially inward to reduce an inner diameter of the cable gripping portion so as to permit the cable gripping portion to receive cables having different outside diameters.

Embodiments provide a coaxial cable connector that may have: a first portion that may have a rearward cable receiving end and a forward end opposite the rearward end; a second portion that may have a front end and a back end, the forward end of the first portion may be structurally configured to be coupled to the back end of the second portion; a third portion that may be structurally configured to be coupled with the front end of the second portion; a support portion that may be structurally configured to be positioned in the second portion; and a cable gripping portion that may be structurally configured to be positioned partially in the support portion. The support portion may be structurally configured to move axially relative to the cable gripping portion in response to the first portion moving relative to the second portion; the cable gripping portion may be structurally configured to include a ramp portion; the support portion may be structurally configured to include a ramp portion that may be structurally configured to contact the ramp portion of the cable gripping portion; the first portion may be structurally configured to be coupled with the second portion such that rotation of the first portion relative to the second portion moves the first portion axially relative to the second portion; the first portion may be structurally configured to move the support portion axially relative to the second portion in response to the axial movement of the first portion relative to the second portion; the ramp of the support portion may be structurally configured to move relative to the ramp of the cable gripping portion in response to axial movement of the support portion such that the cable gripping portion is moved radially inward; the cable gripping portion may include an engaging portion that may be structurally configured to extend radially outward; the second portion may include a second portion rotation prevention portion that may be structurally configured to extend radially inward; the engaging portion of the cable gripping portion may be structurally configured to allow rotation of the cable gripping portion relative to the second portion in a second rotational direction to permit tightening of the second portion to the third portion; the engaging portion of the cable gripping portion may be structurally configured to engage the second portion rotation prevention portion to prevent the cable gripping portion from rotating relative to the second portion in a first rotational direction so as to permit the cable gripping portion to be threadedly coupled with a coaxial cable by rotating the coaxial cable relative to the cable gripping portion while inserting the coaxial cable into the connector; and the cable gripping portion may include a gap that may be structurally configured to permit the cable gripping portion to move radially inward to reduce an inner diameter of the cable gripping portion so as to permit the cable gripping portion to receive cables having different outside diameters.

In particular embodiments, the third portion may be structurally configured as a front nut assembly.

In particular embodiments, the first portion may be structurally configured as a back nut assembly.

In particular embodiments, the support portion may be structurally configured as a support sleeve.

In particular embodiments, the second portion may be structurally configured as a center body.

In particular embodiments, the cable gripping portion may be structurally configured as a cable gripping ferrule.

In particular embodiments, the engaging portion of the cable gripping portion may be structurally configured as a lug.

In particular embodiments, the first portion may be structurally configured to include a threaded portion, the second portion may be structurally configured to include a threaded portion, and the threaded portion of the first portion may be structurally configured to be threadedly engaged with the threaded portion of the second portion such that rotation of the first portion relative to the second portion moves the first portion axially relative to the second portion.

In particular embodiments, the cable gripping portion may include a helical internal gripping surface that may be structurally configured to engage an outer jacket of a coaxial cable.

Embodiments provide a connector having: a first portion that may have a rearward cable receiving end and a forward end opposite the rearward end; a second portion that may have an end, the forward end of the first portion may be being structurally configured to be coupled to the end of the second portion; a support portion that may be structurally configured to be positioned in the second portion; and a cable gripping portion that may be structurally configured to be positioned partially in the support portion. The support portion may be structurally configured to move axially relative to the cable gripping portion in response to the first portion moving relative to the second portion; the first portion may be structurally configured to be coupled with the second portion such that rotation of the first portion relative to the second portion moves the first portion axially relative to the second portion; the cable gripping portion may include an engaging portion; the second portion may include a second portion rotation prevention portion; the engaging portion of the cable gripping portion may be structurally configured to allow rotation of the cable gripping portion relative to the second portion in a second rotational direction to permit tightening of the second portion to the third portion; and the engaging portion of the cable gripping portion may be structurally configured to engage the second portion rotation prevention portion to prevent the cable gripping portion from rotating relative to the second portion in a first rotational direction so as to permit a coaxial cable to be rotated relative to the cable gripping portion while inserting the coaxial cable into the connector.

In particular embodiments, the end of the second portion may be a first end, and the connector may further comprise a third portion that may be structurally configured to be coupled with a second end of the second portion.

In particular embodiments, the support portion may be structurally configured to contact the cable gripping portion.

In particular embodiments, the first portion may be structurally configured to move into the second portion.

In particular embodiments, the cable gripping portion may be structurally configured to include a ramp portion, the support portion may be structurally configured to include a ramp portion that may be structurally configured to contact the ramp portion of the cable gripping portion, and the ramp portion of the support portion may be structurally configured to move axially relative to the ramp portion of the cable gripping portion in response to the first portion moving into the second portion.

In particular embodiments, the support portion may be structurally configured to move relative to the cable gripping portion in response to axial movement of the support portion such that the cable gripping portion is moved radially inward.

In particular embodiments, the first portion may be structurally configured to move the support portion axially into the second portion in response to the axial movement of the first portion relative to the second portion.

In particular embodiments, the engaging portion may be structurally configured to extend radially outward, and the second portion rotation prevention portion may be structurally configured to extend radially inward.

In particular embodiments, the cable gripping portion may include a gap that may be structurally configured to permit the cable gripping portion to move radially inward to reduce an inner diameter of the cable gripping portion so as to permit the cable gripping portion to receive cables having different outside diameters.

Embodiments provide a connector having: a first portion; a second portion; and a cable gripping portion. The cable gripping portion may be structurally configured to allow rotation of the cable gripping portion relative to the second portion in a second rotational direction to permit tightening of the second portion to a third portion; and the cable gripping portion may be structurally configured to engage the second portion to prevent the cable gripping portion from rotating relative to the second portion in a first rotational direction so as to permit a coaxial cable to be rotated relative to the cable gripping portion while inserting the coaxial cable into the connector.

In particular embodiments, the first portion may be structurally configured to be coupled with the second portion such that rotation of the first portion relative to the second portion moves the first portion axially relative to the second portion.

In particular embodiments, the cable gripping portion may be structurally configured to include a ramp portion, the second portion may be structurally configured to include a ramp portion that may be structurally configured to contact the ramp portion of the cable gripping portion, and the ramp portion of the second portion may be structurally configured to move axially relative to the ramp portion of the cable gripping portion in response to the first portion moving into the second portion.

In particular embodiments, the cable gripping portion may include a gap that may be structurally configured to permit the cable gripping portion to move radially inward to reduce an inner diameter of the cable gripping portion so as to permit the cable gripping portion to receive cables having different outside diameters.

In particular embodiments, the first portion may have a cable receiving end and a first end opposite the cable receiving end.

In particular embodiments, the first end of the first portion may be structurally configured to be coupled to the second portion.

In particular embodiments, the cable gripping portion may include an engaging portion; the second portion includes a second portion rotation prevention portion; the engaging portion of the cable gripping portion is structurally configured to allow rotation of the cable gripping portion relative to the second portion in a second rotational direction to permit tightening of the second portion to a third portion; and the engaging portion of the cable gripping portion is structurally configured to engage the second portion rotation prevention portion to prevent the cable gripping portion from rotating relative to the second portion in a first rotational direction so as to permit a coaxial cable to be rotated relative to the cable gripping portion while inserting the coaxial cable into the connector.

In particular embodiments, the connector may further comprise a support portion. The support portion may be structurally configured to move axially relative to the cable gripping portion in response to the first portion moving relative to the second portion.

In particular embodiments, the support portion may be structurally configured to be positioned in the second portion.

In particular embodiments, the cable gripping portion may be structurally configured to be positioned partially in the support portion.

In particular embodiments, the cable gripping portion may be structurally configured to include a ramp portion, the support portion may be structurally configured to include a ramp portion that may be structurally configured to contact the ramp portion of the cable gripping portion, and the ramp portion of the support portion may be structurally configured to move axially relative to the ramp portion of the cable gripping portion in response to the first portion moving into the second portion.

Although embodiments of the disclosure are described with reference to a hardline connector, the features of the disclosure are also applicable to flexible coaxial cable connectors.

Various aspects of the hardline coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure prevent the rotation of a cable gripping portion, for example, a cable gripping ferrule, relative to a center body of a connector in one rotational direction while preventing rotation of the cable gripping portion relative to the center body in an opposite direction. Preventing rotation in one direction simplifies connecting the connector to a coaxial cable by allowing a user to rotate the coaxial cable (relative to the stationary cable gripping ferrule) while inserting the coaxial cable into the connector such that the coaxial cable engages a helical internal gripping surface and threads the coaxial cable onto the helical internal gripping surface of the cable gripping ferrule. Allowing rotation of the cable gripping ferrule in the opposite direction facilitates tightening of the center body to a front body to which the center body is ultimately attached by permitting the center body to rotate relative to the cable gripping ferrule (and the cable held by the cable gripping ferrule).

Embodiments of the disclosure provide a hardline connector that can be used with cables having different outside diameters and simplifies proper connection of the connector to the hardline cable. Although examples shown include a three-piece body (front nut assembly, center body, back nut assembly), other embodiments include a two piece body such as, for example, a main body and a back nut assembly.

Figure 1:
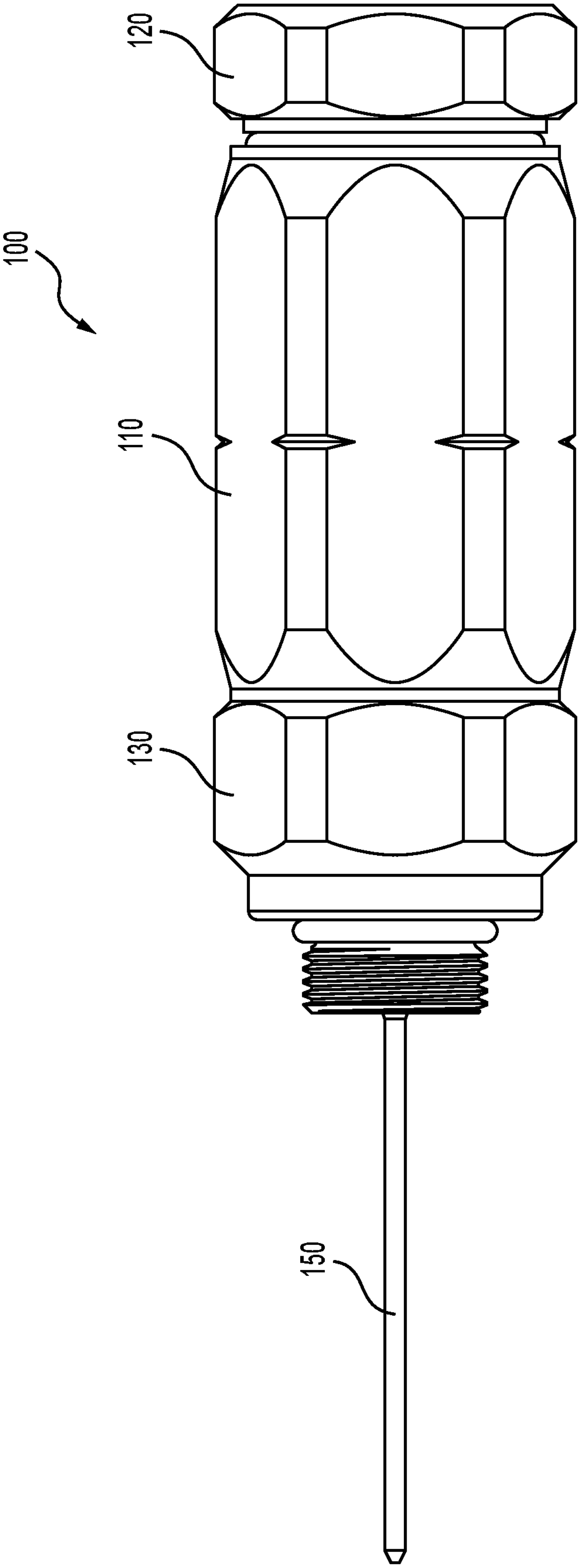
FIG. 1 is a side view of an exemplary hardline connector in accordance with various aspects of the disclosure.
Figure 2:
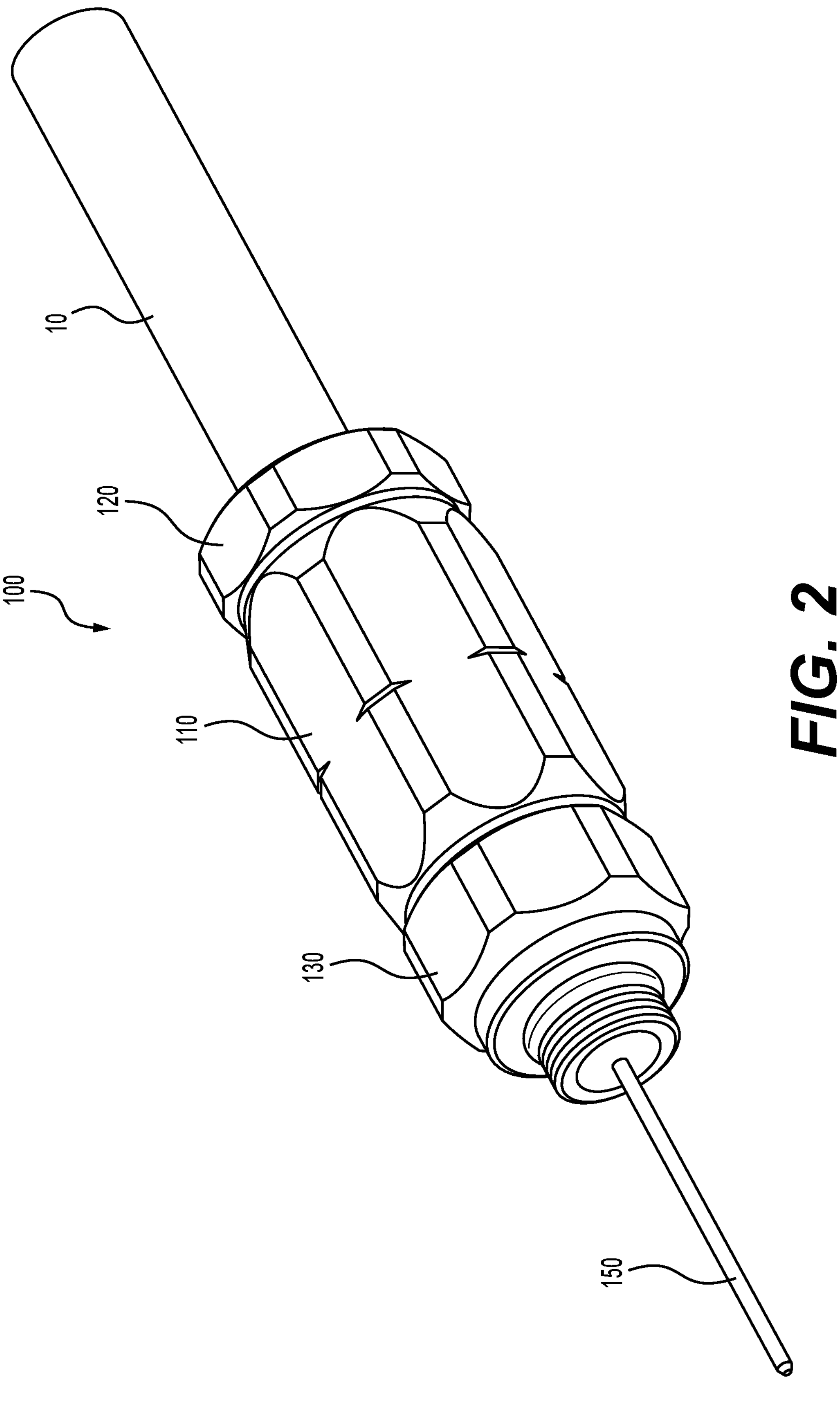
FIG. 2 is a perspective view of the connector of FIG. 1 installed on a coaxial cable.

Referring FIGS. 1 and 2, a connector 100 is depicted. In embodiments, connector 100 is configured for hardline or semi-rigid coaxial cables. In this example, the connector 100 includes a third portion, for example a front nut assembly, 130 and a first portion, for example, a back nut assembly, 120 that are configured to be removably connected to a second portion, for example, a center body, 110 while providing a mechanical connection therebetween.

A coaxial cable 10, for example, a hardline coaxial cable, is inserted into the rearward end of the back nut assembly 120 of the connector 100. Coaxial cables generally include a solid center conductor typically formed from a conductive metal, such as copper, copper clad aluminum, copper clad steel, or the like capable of conducting electrical signals therethrough. Surrounding the cable center conductor is a cable dielectric, which insulates the cable center conductor to minimize signal loss. The cable dielectric also maintains a spacing between the cable center conductor and a cable outer conductor or shield. The cable dielectric is often a plastic material, such as a polyethylene, a fluorinated plastic material, such as a polyethylene or a polytetrafluoroethylene, a fiberglass braid, or the like. The cable shield or outer conductor is typically made of metal, such as aluminum or copper, and is often extruded to form a hollow tubular structure with a solid wall having a smooth exterior surface. An insulative cable jacket may surround the cable outer conductor to further seal the coaxial cable. The cable jacket is typically made of plastic, such as polyvinylchloride, polyethylene, polyurethane, or polytetrafluoroethylene.

Figure 3:
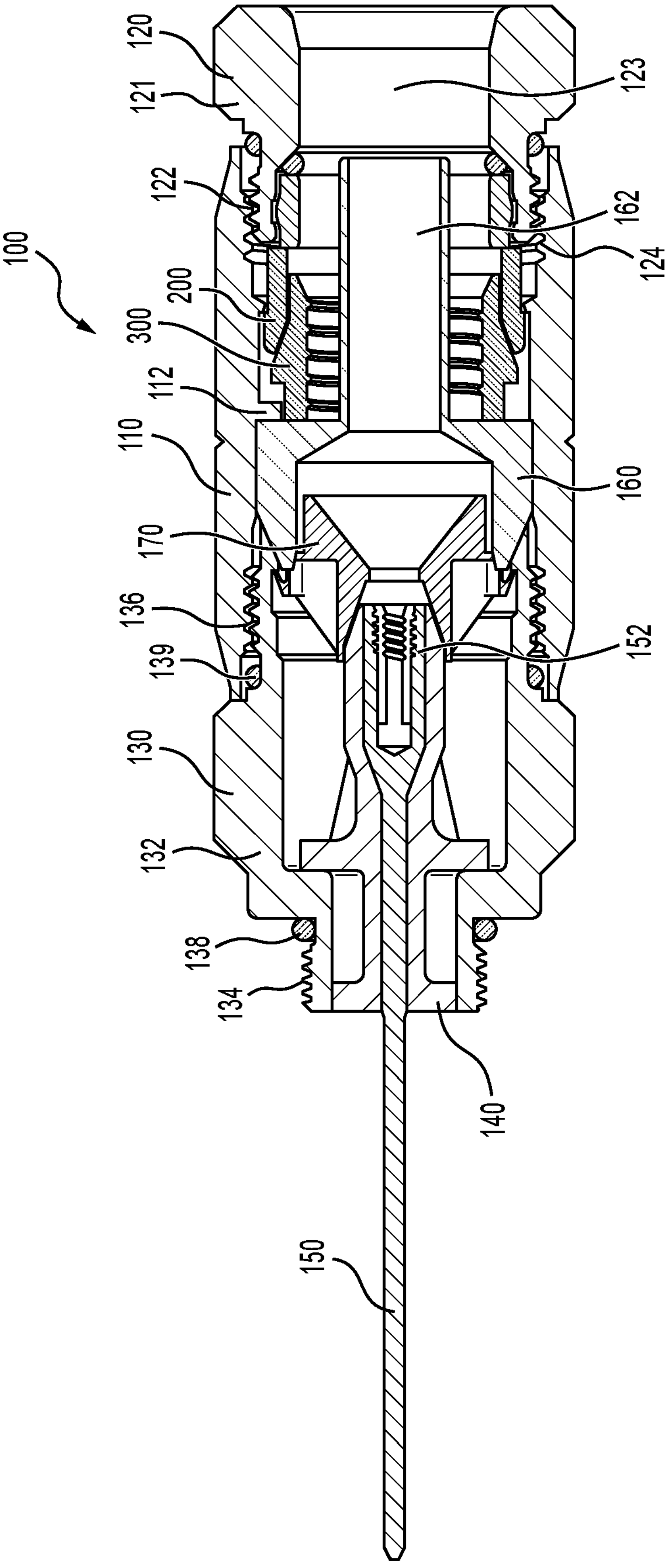
FIG. 3 is a sectional view of the connector of FIG. 1 before being installed on a coaxial cable.
Figure 4:
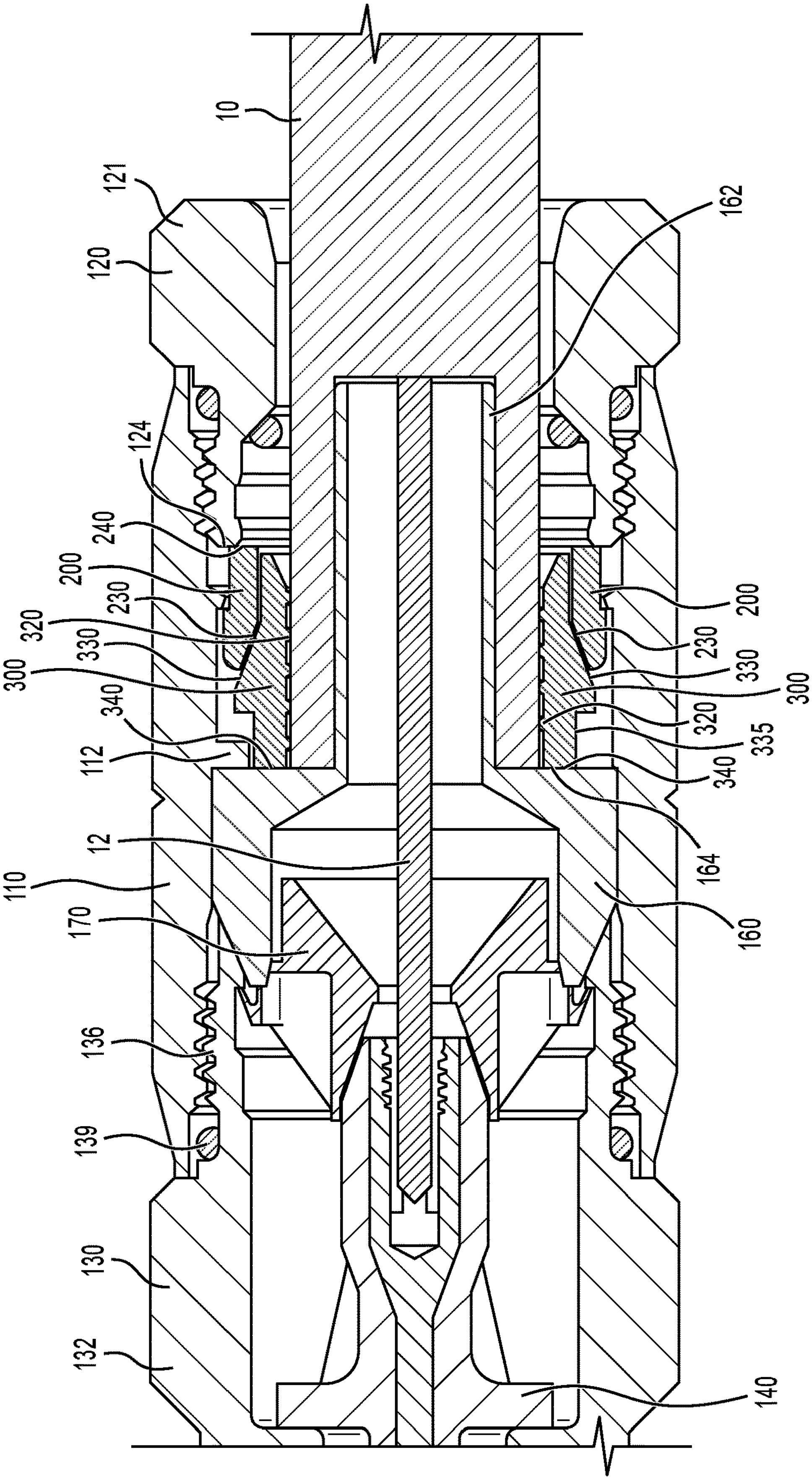
FIG. 4 is a partial sectional view of the connector of FIG. 1 installed on a coaxial cable.

Referring to FIGS. 3 and 4, in this example, the connector 100 includes a plurality of components generally having a coaxial configuration about an axis defined by a center conductor 12 (FIG. 4) of the coaxial cable 10. The front nut assembly 130 includes a third portion housing, for example, a front body housing, 132 supporting a pin assembly 150 therein. Specifically, the front body housing 132 is formed with an axial bore configured to cooperatively contain the pin assembly 150 and is made, for example, from an electrically conductive material such as aluminum, brass, or the like. The front body housing 132 is formed with a third portion first connection portion, for example, an external threaded portion, 134 at its forward end and a third portion second connection portion, for example, a rearward external threaded portion, 136 opposite the forward threaded portion 134. The forward threaded portion 134 is configured to cooperate with devices located in the field that receive the forward end of the pin assembly 150. A seal, for example, an O-ring, 138 may be provided around the forward threaded portion 134 to improve the seal that is made with a device. A portion of the exterior perimeter of the front body housing 132 may be provided with a hexagonal shape to accommodate the use of tools during installation. An insulative (i.e., non-conductive) body 140 maintains the position of the pin assembly 150 in the front body housing 132. A seizure portion, for example, a seizure bushing, 170 is urged forward into the front nut housing 132 by a conductor portion, for example, a mandrel, 160 during assembly and compresses a gripping portion 152 of the pin assembly 150 around the center conductor 12 of the coaxial cable 10.

The rearward threaded portion 136 of the front nut assembly 130 is configured to cooperate with the center body 110. Specifically, the rearward threaded portion 136 includes a rim face that cooperates with the mandrel 160. A seal, for example, an O-ring, 139 may be provided around the rearward threaded portion 136 to improve the seal that is made with the center body 110.

The center body 110 of the connector 100 includes a compression subassembly rotatably supported within the axial bore. The compression subassembly generally includes the mandrel 160, a support portion, for example, a support sleeve, 200, and a cable gripping portion, for example, a cable gripping ferrule, 300 arranged in a coaxial relationship about the central axis of the center body 110.

A first portion housing, for example, a back body housing, 121 of the back nut 120 is, in this example, made from an electrically conductive material, such as aluminum, brass, or the like, and includes a first portion first connection portion, for example, a forward threaded portion, 122 configured to cooperate with a second portion connection portion, for example, a rearward threaded portion, of the center body 110 so that the back body housing 121 and the center body 110 may be threadedly coupled together. The exterior surface of the back body housing 121 is preferably provided with a hexagonal shape to accommodate the use of tools to facilitate such threaded coupling.

FIG. 3 shows the connector 100 before it is installed on the coaxial cable 10. FIG. 4 shows the connector 100 after it is installed on the coaxial cable 10. The back body housing 121 has a cable receiving portion, for example, a central bore, 123 that receives the coaxial cable 10. As shown in FIGS. 3 and 4, the mandrel 160 has a tubular extension 162 that extends into the coaxial cable 10 when the connector 100 is installed on the coaxial cable 10. The tubular extension 162 makes an electrical connection with the cable outer conductor of the coaxial cable 10 and is electrically connected to the front body housing 132.

FIG. 3 shows the connector 100 in a pre-installed position before the connector 100 is installed on the coaxial cable 10. FIG. 4 shows the parts of the connector 100 shown in FIG. 4 in an installed position on the coaxial cable 10. As shown in FIGS. 3 and 4, a third surface portion, for example, a front surface, 124 of the back body housing 121 contacts a support portion first surface portion, for example, a rear surface, 240 of the support sleeve 200. Rotating the back body housing 121 relative to the center body 110 causes the back body housing 121 to move farther into the center body 110 due to the threaded connection between the back body housing 121 and the center body 110. Forward movement of the back body housing 121 (to the left in FIGS. 3 and 4) into the center body 110 causes the front surface 124 of the back body housing 121 to press against the rear surface 240 of the support sleeve 200 and move the support sleeve 200 farther into the center body 110. The forward movement of the support sleeve 200 causes the support sleeve 200 to move axially relative to the cable gripping ferrule 300. As shown in FIGS. 3 and 4, a cable gripping portion first surface portion, for example, a front surface, 340 of the cable gripping ferrule 300 contacts a conductor portion first surface portion, for example, a rear surface, 164 of the mandrel 160 to limit the forward movement of the cable gripping ferrule 300.

As the support sleeve 200 moves axially forward relative to the cable gripping ferrule, a ramp 230 of the support sleeve 200 presses both axially and radially on a ramp 330 of the cable gripping ferrule 300. Comparing FIG. 4 to FIG. 3 shows the back body housing 121 being located farther in the center body 110 after the connector is installed on the coaxial cable 10. A comparison of FIG. 4 to FIG. 3 also shows the support sleeve 200 overlapping the cable gripping ferrule 300 more when the connector is installed on the coaxial cable 10. The inward radially force exerted on the cable gripping ferrule 300 by the support sleeve 200 causes the cable gripping ferrule 300 to be clamped onto the coaxial cable 10.

Figure 5:
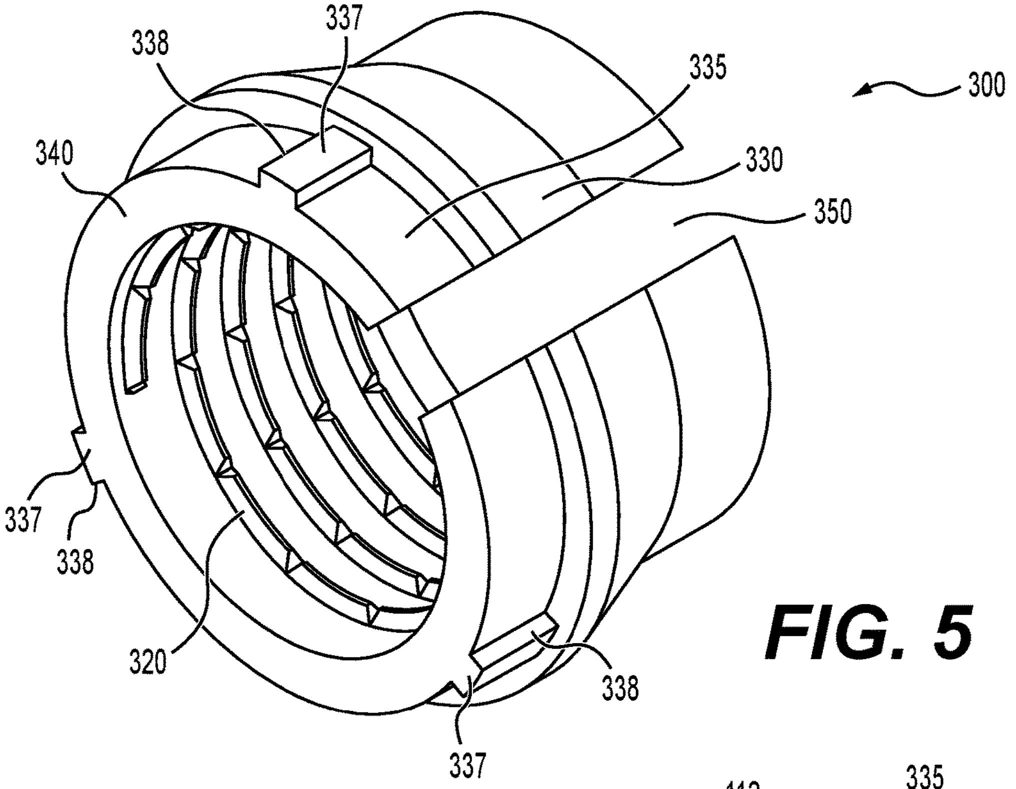
FIG. 5 is a perspective view of an exemplary cable gripping ferrule in accordance with various aspects of the disclosure.

FIG. 5 shows the cable gripping ferrule 300, in this example, having a one-part body which has an internal gripping surface 320. Also shown in FIG. 5 is the front surface 340 of the cable gripping ferrule 300, and an axial gap 350 that permits radial compression of the cable gripping ferrule 300 in response to the radial force exerted on the cable gripping ferrule 300 by the support sleeve 200. While FIG. 5 shows the cable gripping ferrule 300 having a one-part body, other embodiments have a body having two or more pieces. FIG. 5 shows the cable gripping ferrule 300 having one or more (in this example, three) engaging portions, for example, lugs, 337 that extend radially from a surface 335 of the cable gripping ferrule 300. The lugs 337 each have a gripping ferrule rotation prevention surface 338 that is configured to contact one or more center body rotation prevention portions 112 to prohibit the cable gripping ferrule 300 from rotating relative to the center body 110 in a particular direction. In this example, the gripping ferrule rotation prevention surface 338 contacts a surface 113 on the center body rotation prevention portion 112 to prevent the cable gripping ferrule 300 from rotating in the clockwise direction in FIG. 6.

Figure 6:
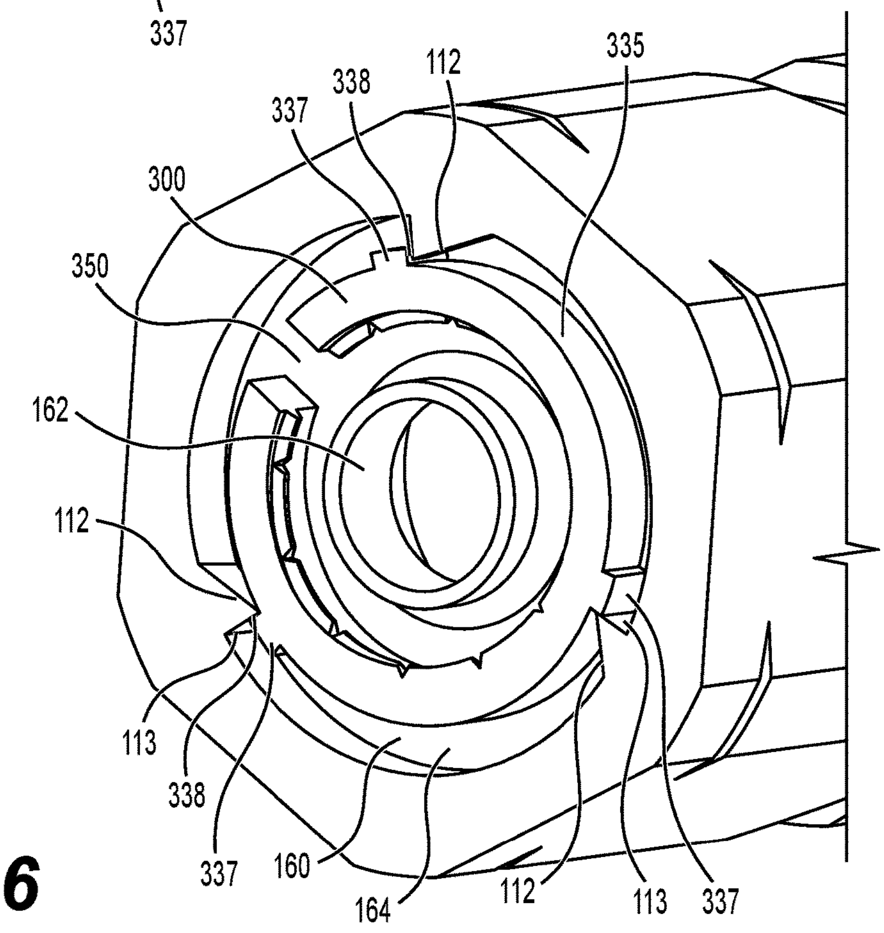
FIG. 6 is a sectional perspective view of the connector of FIG. 1.

FIG. 6 is a sectional view of the center body 110, the mandrel 160, and the cable gripping ferrule 300. FIG. 6 shows the front surface 340 of the cable gripping ferrule 300 contacting the rear surface 164 of the mandrel 160. As shown in FIG. 6, the center body rotation prevention portions 112 have a ramped surface the allows the cable gripping ferrule 300 to rotate in the counterclockwise direction relative to the center body 110. The particular ramp configuration of the center body rotation prevention portions 112 shown in FIG. 6 pushes the lugs 337 radially inward as the cable gripping ferrule 300 is rotated in the counterclockwise direction. It is noted that clockwise and counterclockwise can be reversed in other exemplary embodiments.

The ramp configuration of the center body rotation prevention portions 112 are beneficial in that they prevent rotation while inserting the cable, and allow rotation when connecting the center body 110 to the front nut assembly 130.

Figure 7:
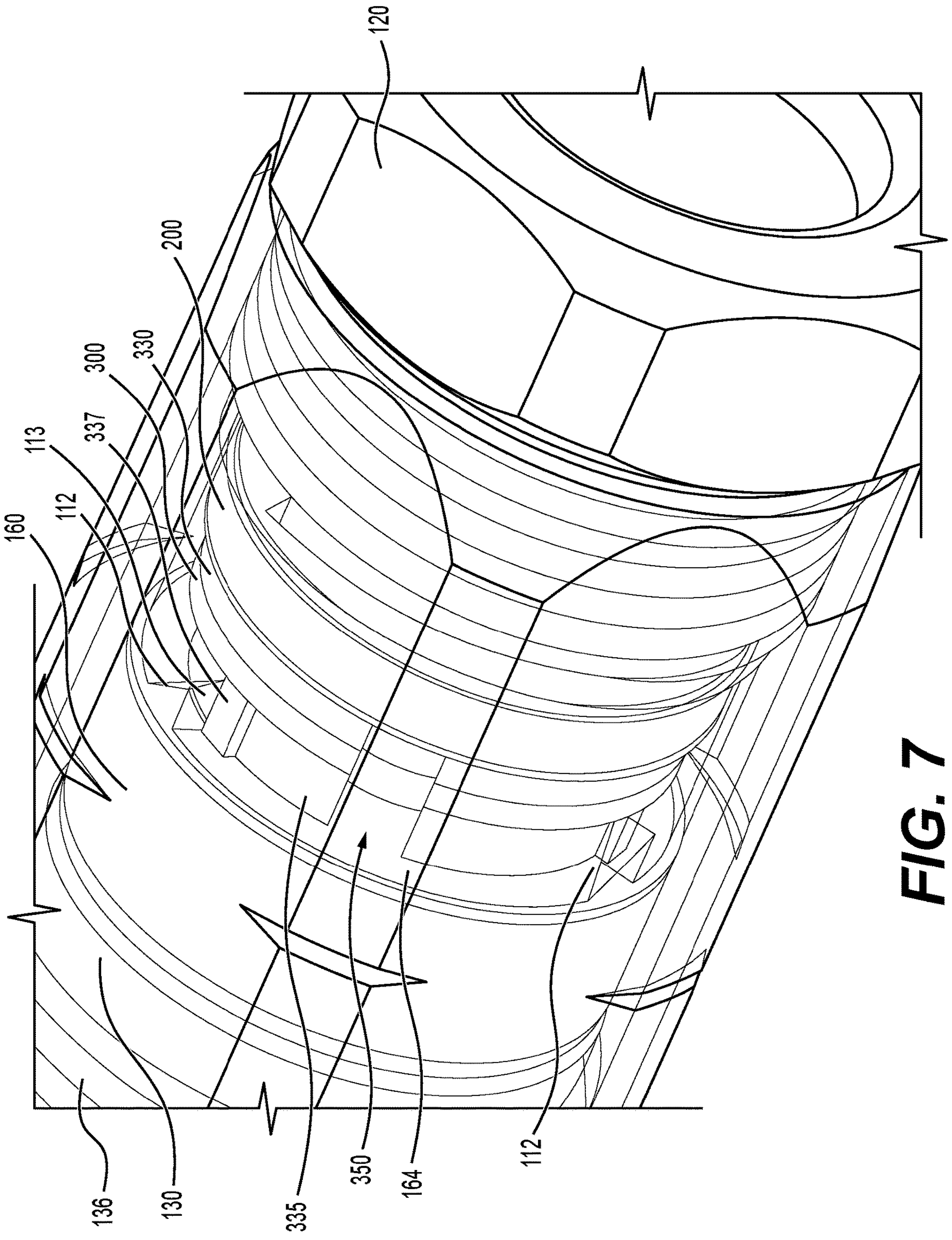
FIG. 7 is a partially transparent perspective view of the connector of FIG. 1.

FIG. 7 is a perspective view with the center body 110 shown transparent so that the cable gripping ferrule 300, the support sleeve 200, and the mandrel 160 can be seen.

As described above, movement of the back body housing 121 into the center body 110 causes the cable gripping ferrule 300 to clamp down on the coaxial cable 10. The farther the back body housing 121 moves into the center body 110, the more radially inward force is exerted on the coaxial cable 10 by the cable gripping ferrule 300. The axial gap 350 of the cable gripping ferrule 300 allows the cable gripping ferrule to contract radially inward under the radially inward force exerted on the cable gripping ferrule 300 by the support sleeve 200. The radially inward contraction causes an inner diameter of the cable gripping ferrule 300 to change depending on the amount of force applied by the support sleeve 200. As a result of this variable inner diameter, the connector 100 can be securely installed on coaxial cables of different outer diameters.

Embodiments having a one-piece cable gripping ferrule, such as cable gripping ferrule 300 shown in the Figures, have the advantage of being easier to manufacture and assemble. A multi-piece cable gripping ferrule can be more difficult to assemble due the need to hold the multiple pieces in the proper position while the connector is assembled. For example, the ends of the multiple pieces opposite to the ends contacted by the support sleeve can tend to move radially inward due to gaps between the multiple pieces. In contrast, a one-piece cable gripping ferrule naturally maintains its shape during assembly.

Rotating the coaxial cable 10 while inserting the coaxial cable 10 into the connector 100 can facilitate full insertion to the point where the coaxial cable 10 contacts the rear surface 164 of the mandrel 160. The, in this example, threaded, formation of the internal gripping surface 320 of the cable gripping ferrule 300 provides a secure contact between the cable gripping ferrule 300 and the coaxial cable 10. If the cable gripping ferrule was allowed to freely rotate within the center body 110, no relative rotation would exist between the cable gripping ferrule 300 and the coaxial cable 10 as the coaxial cable was rotated. This could result in the coaxial cable 10 not being inserted completely into the cable gripping ferrule 300. As described above, the interaction between the lugs 337 and the center body rotation prevention portions 112 prevents the cable gripping ferrule 300 from rotating relative to the center body 100. As a result, the cable gripping ferrule 300 is prevented from rotating when the coaxial cable 10 is rotated, which facilitates insertion of the coaxial cable 10 into the connector 100.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A coaxial cable connector comprising:

a first portion having a rearward cable receiving end and a forward end opposite the rearward end;

a second portion having a front end and a back end, the forward end of the first portion being structurally configured to be coupled to the back end of the second portion;

a third portion that is structurally configured to be coupled with the front end of the second portion;

a support portion that is structurally configured to be positioned in the second portion;

a cable gripping portion that is structurally configured to be positioned partially in the support portion;

wherein the support portion is structurally configured to move axially relative to the cable gripping portion in response to the first portion moving relative to the second portion;

wherein the cable gripping portion is structurally configured to include a ramp portion;

wherein the support portion is structurally configured to include a ramp portion that is structurally configured to contact the ramp portion of the cable gripping portion;

wherein the first portion is structurally configured to be coupled with the second portion such that rotation of the first portion relative to the second portion moves the first portion axially relative to the second portion;

wherein the first portion is structurally configured to move the support portion axially relative to the second portion in response to the axial movement of the first portion relative to the second portion;

wherein the ramp of the support portion is structurally configured to move relative to the ramp of the cable gripping portion in response to axial movement of the support portion such that the cable gripping portion is moved radially inward;

wherein the cable gripping portion includes an engaging portion that is structurally configured to extend radially outward;

wherein the second portion includes a second portion rotation prevention portion that is structurally configured to extend radially inward;

wherein the engaging portion of the cable gripping portion is structurally configured to allow rotation of the cable gripping portion relative to the second portion in a second rotational direction to permit tightening of the second portion to the third portion;

wherein the engaging portion of the cable gripping portion is structurally configured to engage the second portion rotation prevention portion to prevent the cable gripping portion from rotating relative to the second portion in a first rotational direction so as to permit the cable gripping portion to be threadedly coupled with a coaxial cable by rotating the coaxial cable relative to the cable gripping portion while inserting the coaxial cable into the connector; and wherein the cable gripping portion includes a gap that is structurally configured to permit the cable gripping portion to move radially inward to reduce an inner diameter of the cable gripping portion so as to permit the cable gripping portion to receive cables having different outside diameters.

2. The connector of claim 1, wherein the third portion is structurally configured as a front nut assembly.

3. The connector of claim 1, wherein the first portion is structurally configured as a back nut assembly.

4. The connector of claim 1, wherein the support portion is structurally configured as a support sleeve.

5. The connector of claim 1, wherein the second portion is structurally configured as a center body.

6. The connector of claim 1, wherein the cable gripping portion is structurally configured as a cable gripping ferrule.

7. The connector of claim 1, wherein the engaging portion of the cable gripping portion is structurally configured as a lug.

8. The connector of claim 1, wherein the first portion is structurally configured to include a threaded portion, the second portion is structurally configured to include a threaded portion, and the threaded portion of the first portion is structurally configured to be threadedly engaged with the threaded portion of the second portion such that rotation of the first portion relative to the second portion moves the first portion axially relative to the second portion.

9. The connector of claim 1, wherein the cable gripping portion includes a helical internal gripping surface that is structurally configured to engage an outer jacket of a coaxial cable.

10. A connector comprising:

a first portion having a rearward cable receiving end and a forward end opposite the rearward end;

a second portion having an end, the forward end of the first portion being structurally configured to be coupled to the end of the second portion;

a support portion that is structurally configured to be positioned in the second portion;

a cable gripping portion that is structurally configured to be positioned partially in the support portion;

wherein the support portion is structurally configured to move axially relative to the cable gripping portion in response to the first portion moving relative to the second portion;

wherein the first portion is structurally configured to be coupled with the second portion such that rotation of the first portion relative to the second portion moves the first portion axially relative to the second portion;

wherein the cable gripping portion includes an engaging portion;

wherein the second portion includes a second portion rotation prevention portion;

wherein the engaging portion of the cable gripping portion is structurally configured to allow rotation of the cable gripping portion relative to the second portion in a second rotational direction to permit tightening of the second portion to the third portion; and wherein the engaging portion of the cable gripping portion is structurally configured to engage the second portion rotation prevention portion to prevent the cable gripping portion from rotating relative to the second portion in a first rotational direction so as to permit a coaxial cable to be rotated relative to the cable gripping portion while inserting the coaxial cable into the connector.

11. The connector of claim 10, wherein the end of the second portion is a first end, and the connector further comprises a third portion that is structurally configured to be coupled with a second end of the second portion.

12. The connector of claim 10, wherein the support portion is structurally configured to contact the cable gripping portion.

13. The connector of claim 10, wherein the first portion is structurally configured to move into the second portion.

14. The connector of claim 10, wherein the cable gripping portion is structurally configured to include a ramp portion, the support portion is structurally configured to include a ramp portion that is structurally configured to contact the ramp portion of the cable gripping portion, and the ramp portion of the support portion is structurally configured to move axially relative to the ramp portion of the cable gripping portion in response to the first portion moving into the second portion.

15. The connector of claim 10, wherein the support portion is structurally configured to move relative to the cable gripping portion in response to axial movement of the support portion such that the cable gripping portion is moved radially inward.

16. The connector of claim 10, wherein the first portion is structurally configured to move the support portion axially into the second portion in response to the axial movement of the first portion relative to the second portion.

17. The connector of claim 10, wherein the engaging portion is structurally configured to extend radially outward, and the second portion rotation prevention portion is structurally configured to extend radially inward.

18. The connector of claim 10, wherein the cable gripping portion includes a gap that is structurally configured to permit the cable gripping portion to move radially inward to reduce an inner diameter of the cable gripping portion so as to permit the cable gripping portion to receive cables having different outside diameters.

19. A connector comprising:

a first portion;

a second portion;

a cable gripping portion;

wherein the cable gripping portion is structurally configured to allow rotation of the cable gripping portion relative to the second portion in a second rotational direction to permit tightening of the second portion to a third portion; and wherein the cable gripping portion is structurally configured to engage the second portion to prevent the cable gripping portion from rotating relative to the second portion in a first rotational direction so as to permit a coaxial cable to be rotated relative to the cable gripping portion while inserting the coaxial cable into the connector.

20. The connector of claim 19, wherein the first portion is structurally configured to be coupled with the second portion such that rotation of the first portion relative to the second portion moves the first portion axially relative to the second portion.

21. The connector of claim 19, wherein the cable gripping portion is structurally configured to include a ramp portion, the second portion is structurally configured to include a ramp portion that is structurally configured to contact the ramp portion of the cable gripping portion, and the ramp portion of the second portion is structurally configured to move axially relative to the ramp portion of the cable gripping portion in response to the first portion moving into the second portion.

22. The connector of claim 19, wherein the cable gripping portion includes a gap that is structurally configured to permit the cable gripping portion to move radially inward to reduce an inner diameter of the cable gripping portion so as to permit the cable gripping portion to receive cables having different outside diameters.

23. The connector of claim 19, wherein the cable gripping portion includes an engaging portion;

wherein the second portion includes a second portion rotation prevention portion;

wherein the engaging portion of the cable gripping portion is structurally configured to allow rotation of the cable gripping portion relative to the second portion in a second rotational direction to permit tightening of the second portion to a third portion; and wherein the engaging portion of the cable gripping portion is structurally configured to engage the second portion rotation prevention portion to prevent the cable gripping portion from rotating relative to the second portion in a first rotational direction so as to permit a coaxial cable to be rotated relative to the cable gripping portion while inserting the coaxial cable into the connector.

24. The connector of claim 19, wherein the first portion has a cable receiving end and a first end opposite the cable receiving end.

25. The connector of claim 24, wherein the first end of the first portion is structurally configured to be coupled to the second portion.

26. The connector of claim 19, wherein the connector further comprises a support portion; wherein the support portion is structurally configured to move axially relative to the cable gripping portion in response to the first portion moving relative to the second portion.

27. The connector of claim 26, wherein the cable gripping portion is structurally configured to include a ramp portion, the support portion is structurally configured to include a ramp portion that is structurally configured to contact the ramp portion of the cable gripping portion, and the ramp portion of the support portion is structurally configured to move axially relative to the ramp portion of the cable gripping portion in response to the first portion moving into the second portion.

28. The connector of claim 26, wherein the support portion is structurally configured to be positioned in the second portion.

29. The connector of claim 28, wherein the cable gripping portion is structurally configured to be positioned partially in the support portion.

* * * * *